(12) United States Patent
Lawton

(10) Patent No.: US 11,124,609 B2
(45) Date of Patent: Sep. 21, 2021

(54) POLYMERIC COATINGS FOR METAL SURFACES

(71) Applicant: Seabourne Solutions, LLC, Landenberg, PA (US)

(72) Inventor: John A. Lawton, Landenberg, PA (US)

(73) Assignee: Seabourne Solutions, LLC, Landenberg, PA (US)

( * ) Notice: Subject to any disclaimer, the term of this patent is extended or adjusted under 35 U.S.C. 154(b) by 162 days.

(21) Appl. No.: 16/315,385

(22) PCT Filed: Jul. 28, 2017

(86) PCT No.: PCT/US2017/044358
§ 371 (c)(1),
(2) Date: Jan. 4, 2019

(87) PCT Pub. No.: WO2018/026648
PCT Pub. Date: Feb. 8, 2018

(65) Prior Publication Data
US 2019/0211154 A1 Jul. 11, 2019

Related U.S. Application Data

(60) Provisional application No. 62/371,561, filed on Aug. 5, 2016.

(51) Int. Cl.

| | | |
|---|---|---|
| *F16C 33/04* | (2006.01) | |
| *C08G 77/28* | (2006.01) | |
| *C09D 5/08* | (2006.01) | |
| *C09D 183/08* | (2006.01) | |
| *C08G 77/26* | (2006.01) | |
| *C09D 123/06* | (2006.01) | |
| *C09D 5/16* | (2006.01) | |
| *A01N 41/06* | (2006.01) | |
| *A01N 41/08* | (2006.01) | |
| *A01N 43/70* | (2006.01) | |
| *C09D 5/14* | (2006.01) | |
| *C10M 107/50* | (2006.01) | |
| *B05D 5/08* | (2006.01) | |
| *C10N 40/00* | (2006.01) | |
| *C10N 50/08* | (2006.01) | |
| *C08G 77/00* | (2006.01) | |

(52) U.S. Cl.
CPC ............ *C08G 77/28* (2013.01); *A01N 41/06* (2013.01); *A01N 41/08* (2013.01); *A01N 43/70* (2013.01); *C08G 77/26* (2013.01); *C09D 5/08* (2013.01); *C09D 5/14* (2013.01); *C09D 5/1637* (2013.01); *C09D 5/1675* (2013.01); *C09D 123/06* (2013.01); *C09D 183/08* (2013.01); *C10M 107/50* (2013.01); *B05D 5/08* (2013.01); *B05D 2202/45* (2013.01); *C08G 77/70* (2013.01); *C08G 77/80* (2013.01); *C08G 2150/90* (2013.01); *C10M 2229/0525* (2013.01); *C10M 2229/0535* (2013.01); *C10N 2040/50* (2020.05); *C10N 2050/08* (2013.01)

(58) Field of Classification Search
CPC ........ C08G 77/28; C08G 77/70; C08G 77/80; C08G 2150/90; C08G 77/26; C09D 123/06; C09D 5/1675; C09D 5/14; C09D 5/1637; C09D 183/08; C09D 5/08; A01N 41/06; A01N 41/08; A01N 43/70; C10N 2040/50; C10N 2050/08; B05D 2202/45; B05D 5/08; C10M 2229/0525; C10M 2229/0535; C10M 107/50
USPC ........................................................ 508/107
See application file for complete search history.

(56) References Cited

U.S. PATENT DOCUMENTS

| | | | |
|---|---|---|---|
| 6,384,281 B1 | 5/2002 | Keenan et al. | |
| 6,780,516 B2 | 8/2004 | Chen | |
| 8,048,218 B2 | 11/2011 | Nakamura et al. | |
| 10,500,317 B2 | 12/2019 | Schaer et al. | |
| 2001/0029050 A1* | 10/2001 | Starzl ................... | G01N 33/525 436/518 |

(Continued)

FOREIGN PATENT DOCUMENTS

| | | |
|---|---|---|
| KR | 100417350 B1 | 1/2004 |
| WO | WO2012003153 A1 | 1/2012 |

(Continued)

OTHER PUBLICATIONS

Valeur, Eric, and Mark Bradley. "Amide bond formation: beyond the myth of coupling reagents." Chemical Society Reviews 38.2 (2009): 606-631.

(Continued)

*Primary Examiner* — Prem C Singh
*Assistant Examiner* — Francis C Campanell
(74) *Attorney, Agent, or Firm* — Mendelsohn Dunleavy, P.C.

(57) ABSTRACT

Polymer compositions for coating of metal surfaces including moieties that interact with a metal atom in the metal surface and optionally containing antifoulant moieties. These polymer compositions provide lubricious coatings for medical devices, anticorrosion coatings for metal components, and antifoulant coatings for marine components such as propellers. The polymer composition is synthesized in a safe manner in which the synthesis components are added to a synthesis vat and there is no need for filtration or removal of waste materials in any step including the consumer use. As such this invention provides an environmentally sound approach to composition synthesis, formulation development, and consumer use.

14 Claims, No Drawings

(56) References Cited

U.S. PATENT DOCUMENTS

2008/0287984 A1    11/2008   Weber et al.
2009/0018276 A1    1/2009   Boudjouk et al.
2016/0090439 A1*   3/2016   Nikitenko .......... C08G 59/1477
                                                                                                   523/436

FOREIGN PATENT DOCUMENTS

WO     WO201208403 A1    2/2012
WO     WO2014113643 A1   7/2014
WO     WO2015053715 A1   4/2015

OTHER PUBLICATIONS

Zhang, Hongbin, and Mu Chiao. "Anti-fouling coatings of poly (dimethylsiloxane) devices for biological and biomedical applications." Journal of medical and biological engineering 35.2 (2015): 143-155.

Lanigan, Rachel M., Pavel Starkov, and Tom D. Sheppard. "Direct synthesis of amides from carboxylic acids and amines using B(OCH2CF3)3." The Journal of organic chemistry 78.9 (2013): 4512-4523.

* cited by examiner

POLYMERIC COATINGS FOR METAL SURFACES

FIELD OF INVENTION

The present invention relates to polymer compositions that are suitable for use in antifouling coatings for marine applications, anticorrosion coatings for metal components, and lubricating coatings for medical use as well as to coatings containing the polymer compositions.

DESCRIPTION OF RELATED TECHNOLOGY

Current antifouling products for marine propellers often require professional application for safety and technical reasons. Some application guides for the use of antifouling products require that the propeller surface first be sanded with rough sandpaper (such as 80 grit) to improve mechanical bonding of the antifouling agent to the surface of the propeller prior to applying the antifouling products. However, rough sanding of the propeller is generally known to be undesirable, because such sanding removes metal from the propeller, which alters the profile of the propeller, and reduces the life of the propeller.

Some guides for the use of antifouling products require that the propeller surface be acid etched or utilize etching coatings in order to provide improved mechanical bonding of the coatings to the marine surface. The use of acids on certain alloys, from which propellers are typically made, such as bronzes and brass alloys, leads to microstructural roughening of the alloy due to individual metal crystals in the alloy selectively reacting with the acid etch. Such acid etching, or an etching conversion coating, leads to porosity and alloy grain boundary embrittlement. Indeed, the inventor has found that propellers that have been etched with phosphoric acid and rinsed with water have exhibited residual foaming when the propellers were subsequently exposed to a sodium bicarbonate-water solution.

Certain current antifouling coatings require the application of etching conversion coatings that assure mechanical bonding and greater compatibility between the marine surface and the antifoulant coating that is exposed to the marine environment. Such antifouling coatings often require that two people perform the coating process, wherein one person applies the conversion coating and the other person, within three minutes, applies the antifouling coating.

Antifoulant coatings can be relatively viscous silicone-like oils or waxes that prevent fouling organisms from obtaining a grip on the propeller surface due to coating distortion. However, the application of such viscous coatings has a tendency to form ripples and drips when applied to the propeller. There are several problems with such coatings. Surface distortions due to uneven application reduce the propeller efficiency. Also, the thicker coatings, having a wax like consistency, are easily damaged by propeller cavitation, entrained sand, silt, plant material or other debris that is commonly found in sea water. These coatings are fingernail soft; one cannot remove attached growth from the surface without also damaging or removing the coating. Further, such surface distortions provide an opportunity for small amounts of organisms to adhere to the surface; subsequent organisms have improved adhesion possibilities due to thinning of the surface or voids left in the coating.

Antifouling coatings may also be in the form of ablative paints which contain copper and other antifoulant components. Although ablative paints have been designed to withstand the wear of the water slowly passing by the hull, they are not designed to withstand the higher shear forces of the water quickly passing over the surface of the propeller. In such environments, the coatings may be ablated at an accelerated pace decreasing their long term performance and expelling the antifouling components into the environment. In addition, the presence of copper in the coatings leads to a depletion of the non-copper alloying components in the propeller metal.

Korean Patent No. 100417350 B1 relates to a method of producing a controlled release antifouling composition comprising an amine salt, an acid group polymer such as a silicon resin having a MW of 1,000-50,000, and an antifouling composition. This patent teaches that benzotriazole-5-carboxylic acid may be antifouling agent. It appears that the antifouling agent is dissolved or dispersed in the polymer and eluted over time to provide a sustained release antifouling composition.

"Anti-fouling Coatings of Poly(dimethylsiloxane) Devices for Biological and Biomedical Applications," Zhang, Hongbin et al., *J. Med. Biol. Eng.*, 35, pp. 143-155 (2015) discloses in the paragraph entitled, "*Amide-Containing-Hydrophilic-Polymer Based Coatings*", that hydrophilic poly(N-vinylpyrrolidone) can be used to provide anti-fouling properties against protein adsorption when grafted on silicon. In addition, this publication states that amide groups located in the backbone have demonstrated good fouling-resistance for surface modification.

Despite the foregoing, there remains a need in the art for improved antifouling coatings which exhibit good antifouling properties as well as resistance to ablation under conditions of actual use.

SUMMARY OF THE INVENTION

In one aspect, the present invention provides a metal coating composition that can be used to provide a surface coating on a metal having certain characteristics such as desirable frictional and anti-ablative properties.

One aspect of the present invention is to provide a coating for marine applications that can be safely and easily handled by the end user of the product. The user may be a professional worker or a boater.

In another aspect, the present invention provides for an antifouling composition, a method of preparing and using such an antifouling composition and coatings including the antifouling composition. The antifouling compositions and coatings can be employed to solve several problems often encountered when using current marine antifouling coatings.

The coating composition may include a macromolecule having (a) a dimethylsiloxane unit; and (b) a substituted methylsiloxane unit of the formula:

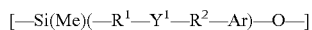

$$[-Si(Me)(-R^1-Y^1-R^2-Ar)-O-]$$

wherein $R^1$ is a $C_1$ to $C_5$ hydrocarbylene group;
$Y^1$ is —NH—C(O)—, —C(O)—NH—, —C(O)—O—, or —O—C(O)—;
$R^2$ is a nothing or a $C_1$ to $C_5$ hydrocarbylene group; and
Ar is a heteroaryl group comprising at least one atom that comprises a lone electron pair.

In some embodiments the $Y^1$ group is —NH—C(O)—. In each of the foregoing embodiments, the atom that comprises a lone electron pair may be a nitrogen atom. In each of the foregoing embodiments the heteroaryl group may be a benzotriazole group.

In each of the foregoing embodiments, the macromolecule may further include a substituted siloxane unit of formula:

$$[-Si(Me)(-R^3-Y^2-R^4-Y^3-Z)-O-]$$

wherein $R^3$ is a $C_1$ to $C_5$ hydrocarbylene group;
$Y^2$ is —NH—C(O)—, —C(O)—NH—, —NH—CH$_2$—C(OH)—, —C(O)—O—, or —O—C(O)—;
$R^4$ is nothing or a $C_1$ to $C_5$ hydrocarbylene group;
$Y^3$ is nothing, —C(O)—NH—, —NH—C(O)—, —C(OH)—CH$_2$—NH—, —C(O)—O—, or —O—C(O)—;
Z is a biologically active residue, or a pendant group comprising the biologically active residue.

In some embodiments, —$Y^3$—Z is —C(O)—NH—Z, wherein —NH—Z is a group derived from a biologically active compound by removal of a hydrogen atom from an amine group in the biologically active compound. In some embodiments, the biologically active compound may be selected from the group consisting of oryzalin, 4-(dipropylamino)-3,5-dinitrobenzenesulfonamide, 6-chloro-1,3,5-triazine-2,4-diamine, 2-aminoethylhydrogen sulfate, and ethanolamine-O-sulfate.

In some embodiments, the biologically active residue may be selected from the group consisting of —SO$_2$—C$_6$H$_2$(NO$_2$)$_2$(NEt$_2$), —C$_3$N$_3$(NH$_2$)Cl, and —CH$_2$—CH$_2$—O—SO$_2$—OH. In some embodiments, the pendant group may include a polyamino polyamide, a polyamino polyester, a polyamino amide ester, a polyamino polyamide ester, a polyamino amide polyester, or a polyamino polyamide polyester.

In each of the foregoing embodiments, the composition may further include an anticorrosion additive.

In other embodiments, the invention relates to a lubricating coating including a macromolecule having (a) a dimethylsiloxane unit; and (b) a substituted methylsiloxane unit of the formula:

$$[-Si(Me)(-R^1-Y^1-R^2-Ar)-O-]$$

wherein $R^1$ is a $C_1$ to $C_5$ hydrocarbylene group;
$Y^1$ is —NH—C(O)—, —C(O)—NH—, —C(O)—O—, or —O—C(O)—;
$R^2$ is a nothing or a $C_1$ to $C_5$ hydrocarbylene group; and
Ar is a heteroaryl group comprising at least one atom that comprises a lone electron pair.

In some other embodiments, the invention relates to a coating composition including (a) heterocyclic group comprising an atom that comprises a lone electron pair; (b) polyethylene; and (c) biologically active residue.

In still other embodiments, the invention relates to a method of preparing a coating composition comprising the step of reacting a polysiloxane that includes an amino group, a carboxylic acid group, or a hydroxyl group, with a heteroaryl compound including an atom that includes a lone electron pair, and that further includes an amino group, a carboxylic acid group, or a hydroxyl group.

In some embodiments, the method may also include the step of reacting the polysiloxane with biologically active compound comprising an amino group, a carboxylic acid group, or a hydroxyl group. In each of the foregoing methods the biologically active compound may be selected from the group consisting of a repellent, an herbicide, and a pesticide.

In each of the foregoing methods, the biologically active compound may be selected from the group consisting of oryzalin, 4-(dipropylamino)-3,5-dinitrobenzenesulfonamide, 6-chloro-1,3,5-triazine-2,4-diamine, 2-aminoethylhydrogen sulfate, and ethanolamine-O-sulfate.

In other embodiments, the invention relates to a method of mitigating organism growth on metal surface by applying including a macromolecule having (a) a dimethylsiloxane unit; and (b) a substituted methylsiloxane unit of the formula:

$$[Si(Me)(-R^1-Y^1-R^2-Ar)-O-]$$

wherein $R^1$ is a $C_1$ to $C_5$ hydrocarbylene group;
$Y^1$ is —NH—C(O)—, —C(O)—NH—, —C(O)—O—, or —O—C(O)—;
$R^2$ is a nothing or a $C_1$ to $C_5$ hydrocarbylene group; and
Ar is a heteroaryl group comprising at least one atom that comprises a lone electron pair. In certain embodiments, this method may be applied to a copper or copper alloy surface.

In other embodiments, the invention relates to a method of forming an amide from a carboxylic acid and an aliphatic amine utilizing a catalyst, comprising a step of reacting the carboxylic acid and aliphatic amine in the presence of a boric acid catalyst.

The present invention provides a coating for marine applications that can be safely and easily handled by the end user of the product. The composition can be easily prepared. The coating adheres to the marine surface not only by the wetting action of the coating composition, but also by chemical bonding between reactive moieties of the coating composition and the marine surface.

One significant advantage of the coatings of the present invention is that the procedure for application of the coating does not require harsh abrasive cleaning. The advantage of not using abrasive cleaning of the marine surface is that the use of abrasive cleaning, such as the use of harsh sandpaper, may alter the profile of the propeller, and/or reduce the life of the propeller.

The coating compositions of the invention may also be applied without acid etching of the marine surface prior to coating application. The advantage of not using an acid to etch the marine surface is that acids tend to affect the structural characteristics of the metal.

As a result, the coatings of the invention may be applied with minimal surface preparation, and thus the coating application may be easily accomplished by unskilled persons. Such minimal amount of surface preparation includes light sanding, washing with water, alcohol, acetone, or other solvents. Also, the coatings of the invention do not need to be applied immediately after application of a conversion coating.

The coating of the invention may also be non-ablative, and thus less sensitive to propeller cavitation than some commercially available antifoulant coatings. This reduces a release of substances into the environment and maintains the coating performance despite cavitation.

The coating of the invention may be thin, and spreads easily on the marine surface without a tendency to drip. Further, the coating of the invention is easily cleaned. The coating of the invention may also provide corrosion resistance.

The coating of the invention is easily cleaned. Should there be dirt or growth development on the marine surface, the marine surface that is coated with antifouling coating may be cleaned using a mesh coated sponge, which does not substantially remove the coating from the marine surface. The coating also withstands fingernail scratching.

Furthermore, rather than depleting the non-copper alloying components from the propeller metal, the coatings described in this invention may form a coating on the marine surface, thereby reducing corrosion and preventing depletion of alloy components.

The coatings of the invention may include antifouling moieties bound to the polymer composition. It is theorized that antifouling moieties linked to the coating may be absorbed by organisms attempting to attach to the surface, thus leading to poisoning of the organism.

The coatings of the present invention may be applied to articles and devices in various technical fields where a lubricious coating with strong adherence to a metal-containing surface is needed, such as in the medical arts. Such a coating does not easily wipe off when the device is inserted into a body, or when removed from a body.

This invention provides adherent polymeric coatings to metal surfaces, wherein the polymeric coatings include macromolecules that comprise moieties that interact with the metal surface and optionally, additional antifoulant moieties. The polymer coating is designed to be spread onto and interact with a metal surface, or a surface that comprises metal atoms.

DETAILED DESCRIPTION OF THE INVENTION

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in other systems and methods. It is to be understood that the invention is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

The singular forms "a", "an", and "the", as used herein and in the appended claims, include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

This disclosure describes compositions designed to provide adherent polymeric coatings to metal surfaces, wherein the polymeric coating comprises macromolecules that comprise metal bonding moieties and optionally tethered antifoulant moieties.

Coating Composition

The polymer coating composition is designed to be spread onto a metal surface, or a surface that comprises metal atoms.

The coating of the present invention may act as antifouling coating. The phrase "antifouling coating" means the coating that adheres to a marine surface and has antifouling properties. The term "antifouling" refers to material that prevents or retards the growth of marine fouling organisms on the marine surface. Such marine fouling organisms include species of hard and soft fouling organisms, such as barnacles, zebra mussels, algae, and slime that form colonies on the underwater surfaces of the vessel, particularly when a vessel is docked, because each requires a permanent anchorage in order to mature and reproduce. Marine growth fouling adds weight to a ship or to a propeller, restricts fluid flow over surfaces, increases the amount of fuel consumed, and reduces its speed.

The phrase "marine surface" means a surface of an object, comprising metal atoms or metal ions that is exposed to sea water, either fresh or salt water. Under one aspect of the present invention, the exposure of the marine surface refers to the continuous, or long term, submersion of the surface in sea water. In such cases, the marine surface is typically in need of antifouling protection. Examples of marine surfaces include surfaces on marine propellers, shafts, thrusters, ladders, anchors, anchor connectors, chains, through hull fittings, parts of steering mechanisms, and other hardware on which foulants may grow. One of the aspects of the present invention is to provide for a coating composition that affords an antifouling protection.

Under another aspect of the present invention, the exposure of the marine surface is intermittently, or occasionally, or infrequently in contact with sea water. For example, such an exposure may be limited to splashes of sea water, or salt air, as may be experienced on the top side of a boat. Although antifouling protection may have only limited usefulness for marine surfaces that are infrequently in contact with sea water, such marine surfaces may need corrosion protection. One of the aspects of the present invention is to provide for a coating composition that affords a corrosion protection.

Under another aspect of the present invention, a coating is provided on surfaces that are not used in the marine environment. For example, the coatings of the invention provide excellent anticorrosion protection for all copper or copper alloy surfaces and as such may be used as a protective polish.

The polymer coating is prepared by the application of a coating composition. The coating composition comprises substituted polydimethylsiloxane macromolecules. Such macromolecules may be of any length or molecular weight that is appropriate to obtain suitable characteristics of the composition, such as viscosity, density, flowability, wettability, and like.

Although the coating composition may contain only substituted polydimethylsiloxane macromolecules, in an alternative embodiment the coating composition may also comprise additional components. Such components include pigments, solvents, viscosity modifiers, fillers, zeolites, catalysts, and surfactants.

The substituted polydimethylsiloxanes include at least two repeating units: a dimethylsiloxane, and a methylsiloxane with a side chain that includes a reactive group. Optionally, the substituted polydimethylsiloxane comprises a methylsiloxane repeating unit also containing an antifoulant group.

The coating composition comprises a siloxane copolymer of dimethylsiloxane and siloxane. The substituent capable of interacting with a metal surface is bound to the methylsiloxane unit, preferably as a side chain. In such case, the siloxane copolymer unit may have the formula:

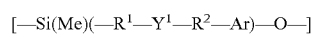

wherein $R^1$ is a $C_1$ to $C_5$ hydrocarbylene group;
$Y^1$ is —NH—C(O)—, —C(O)—NH—, —C(O)—O—, or —O—C(O)—;
$R^2$ is nothing or a $C_1$ to $C_5$ hydrocarbylene group; and
Ar is a heteroaryl group comprising at least one atom that comprises a lone electron pair.

The substituent that interacts with the metal surface is heteroaryl moiety that comprises at least one atom that has a lone electron pair. The heteroaryl group may comprise one or more pnicogens, chalcogens or halogens. The heteroaryl group may comprise one, two, three, four, or more atoms with a lone electron pair. Examples of suitable heteroaryl groups include benzotriazole, mercaptobenzothiazole, benzimidazole, imidazole, and methylbenzotriazole.

The majority of the siloxane groups of the macromolecules of the present invention are dimethylsiloxane. The dimethylsiloxane has the unit formula [—Si(CH$_3$)$_2$—O—]. The ratio of the substituted methylsiloxane units to the dimethylsiloxane units may be from about 1:99 to about 1:4, or, more preferably, from about 1:75 to about 1:20, or, more preferably, from about 1:65 to about 1:30, or, most preferably, from about 1:60 to about 1:35.

The substituted polydimethylsiloxane macromolecules of the present invention may be terminated by any capping group which is suitable for polydimethylsiloxane macromolecules. Examples include a trimethylsiloxane group, [—O—Si(CH$_3$)$_3$], a hydroxyl group, [—O—Si(CH$_3$)$_2$—OH], a vinyl group, —CH=CH$_2$, an aminopropyl group [—O—Si(CH$_3$)$_2$—(CH2)$_3$—NH$_2$], an N-ethylaminoisobutyl group [—O—Si(CH$_3$)$_2$—CH$_2$—[CH—CH$_3$]—[NH—[CH$_2$—CH$_3$]]], and other groups known by skilled persons for use in polydimethylsiloxane macromolecules. In some cases, the capping group is a reactive group and is used in the instant invention for appending antifoulant and/or metal bonding moieties. Such end-chain moieties have the same effect as side-chain moieties discussed herein.

The coating composition as described above may interact with various metal atoms, suitable non-limiting examples of which are Cu, Fe, Zn, Ni, Al, Co, Sn, Cd, Pb, and Cr.

Examples of R$^1$, the C$_1$ to C$_5$ hydrocarbylene group, include —CH$_2$—; —CH$_2$—CH$_2$—; —CH$_2$—CH$_2$—CH$_2$—; —CH$_2$—CH$_2$—CH$_2$—CH$_2$—; —CH$_2$—CH$_2$—CH$_2$—CH$_2$—CH$_2$—; —CH=CH—, —CH=CH—CH$_2$—; and —CH$_2$—CH$_2$—CH=CH—. R$^2$ may be nothing or may be the same or different C$_1$ to C$_5$ hydrocarbylene group as R$^1$.

The heteroaryl group Ar that comprises the at least one atom with the lone electron pair may comprise one or more pnicogens, chalcogens or halogens. The heteroaryl group may comprise one, two, three, four, or more atoms with a lone electron pair. The heteroaryl group may comprise one, two, three, four, or more rings.

The at least one atom that has an electron lone pair may be a pnicogen, a chalcogen, or a halogen. Examples of pnicogens include nitrogen, phosphorus, arsenic, antimony, and bismuth. Examples of chalcogens include oxygen, sulfur, selenium, and tellurium. Examples of halogens include fluorine, chlorine, bromine, and iodine.

The heteroaryl group may have additional substituents attached thereto. Such organic substituents include hydrocarbyl groups, aryl groups, hydroxyl groups, halogens, and like. In one embodiment, the heteroaryl group is an azole-based multi-ring group. Examples of azoles include benzotriazole, mercaptobenzothiazole, benzimidazole, mercaptobenzimidazole, imidazole, tolyol triazole, and tetrazole. Additional examples of the heteroaryl group include groups such as pyrrole, pyrazole, imidazole, triazole, tetrazole, pentazole, oxazole, isoxazole, thiazole, isothiazole, furan, thiophene, phosphole, arsole, stibole, oxazole, isoxazole, thiazole, isothiazole, furazan, oxadiazole, thiadiazole, dithiazole; diazene, pyridine, pyrazine pyrimidine, pyridazine, oxazine, thiazene, triazene, tetrazine; multi-ring groups (such as fused rings) comprising any of such heteroaryl rings.

The metal atom with which the heteroaryl group Ar interacts is located on the surface of an object and may be any one or more metals that comprise the surface. The coating composition as described above may bind to any suitable metal atoms, such as Cu, Fe, Zn, Ni, Al, Co, Sn, Cd, Pb, and Cr. Further, in the case of brass for example, the metal atom with which the heteroaryl group Ar interacts may be copper, zinc or both. In the case of a stainless steel, the metal atom may be one or more of iron, chromium, vanadium, and molybdenum.

The heteroaryl group is attached to the polymer backbone by a bridging group —R$^1$—Y$^1$—R$^2$—. The bridging group optionally comprises heteroatoms. The bridging group comprises a bonding group that may be an amide group or an ester group, preferably an amide group.

Optionally, the substituted polydimethylsiloxane may also comprise a methylsiloxane unit with an antifouling group or a side chain with antifouling activity. The inclusion of an antifouling group is especially useful when the coating composition is to be used for antifouling purposes.

The methylsiloxane unit with the antifouling side chain may have the formula:

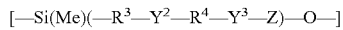

[—Si(Me)(—R$^3$—Y$^2$—R$^4$—Y$^3$—Z)—O—]

wherein R$^3$ is a C$_1$ to C$_5$ hydrocarbylene group;
Y$^2$ is —NH—C(O)—, —C(O)—NH—, —NH—CH$_2$—C(OH)—, —C(O)—O—, or —O—C(O)—;
R$^4$ is nothing, or a C$_1$ to C$_5$ hydrocarbon group;
Y$^3$ is nothing, —C(O)—NH—, —NH—C(O)—, —C(OH)—CH$_2$—NH—, —C(O)—O—, or —O—C(O)—; and
Z is a biologically active residue, or a pendant group comprising a biologically active residue.

When the Z moiety is a biologically active residue, the biologically active residues may be linked to the polymer backbone via the —R$^3$—Y$^2$—R$^4$—Y$^3$— chain. By breaking either the Y$^2$ or Y$^3$ bonding group in the antifouling side chain, a biologically active compound or agent may be released from the coating to provide activity against the fouling organisms.

The biologically active agents may be, for example, antimicrobials, such as antifungal, antiprotozoal, and pesticidal compounds. Other examples of biologically active agents are agents that are repellant, slippery, herbicidal, hydrophilic, hydrophobic, biocidal, acidic, basic, or that act to reduce the adhesion and growth of living substances on the coated metal surface.

Examples of suitable biologically active compounds include H—Z; NH$_2$—Z; $^+$NH$_3$—Z; HOOC—Z; $^-$OOC—Z; HO—Z; H—R$^4$—Y$^3$—Z; NH$_2$—R$^4$—Y$^3$—Z; $^+$NH$_3$—R$^4$—Y$^3$'Z; HOOC—R$^4$—Y$^3$—Z; $^-$OOC—R$^4$—Y$^3$—Z; HO—R$^4$—Y$^3$—Z; H—C(O)—NH—Z, NH$_2$—C(O)—NH—Z, $^+$NH$_3$—C(O)—NH—Z, HOOC—C(O)—NH—Z, $^-$OOC—C(O)—NH—Z, HO—C(O)—NH—Z; H—CH$_2$—C(O)—NH—Z, NH$_2$—CH$_2$—C(O)—NH—Z, $^+$NH$_3$—CH$_2$—C(O)—NH—Z, HOOC—CH$_2$—C(O)—NH—Z, $^-$OOC—CH$_2$—C(O)—NH—Z, HO—CH$_2$—C(O)—NH—Z; H—CH$_2$—CH$_2$—C(O)—NH—Z, NH$_2$—CH$_2$—CH$_2$—C(O)—NH—Z, $^+$NH$_3$—CH$_2$—CH$_2$—C(O)—NH—Z, HOOC—CH$_2$—CH$_2$—C(O)—NH—Z, $^-$OOC—CH$_2$—CH$_2$—C(O)—NH—Z, HO—CH$_2$—CH$_2$—C(O)—NH—Z; H—CH$_2$—CH$_2$—CH$_2$—C(O)—NH—Z, NH$_2$—CH$_2$—CH$_2$—CH$_2$—C(O)—NH—Z, $^+$NH$_3$—CH$_2$—CH$_2$—CH$_2$—C(O)—NH—Z, HOOC—CH$_2$—CH$_2$—CH$_2$—C(O)—NH—Z, $^-$OOC—CH$_2$—CH$_2$—CH$_2$—C(O)—NH—Z, OH—CH$_2$—CH$_2$—CH$_2$—C(O)—NH—Z; H—CH$_2$—CH$_2$—CH$_2$—CH$_2$—C(O)—NH—Z, NH$_2$—CH$_2$—CH$_2$—

CH$_2$—CH$_2$—C(O)—NH—Z, $^+$NH$_3$—CH$_2$—CH$_2$—CH$_2$—CH$_2$—C(O)—NH—Z, HOOC—CH$_2$—CH$_2$—CH$_2$—CH$_2$—C(O)—NH—Z, $^-$OOC—CH$_2$—CH$_2$—CH$_2$—CH$_2$—C(O)—NH—Z, HO—CH$_2$—CH$_2$—CH$_2$—CH$_2$—C(O)—NH—Z; H—CH$_2$—CH$_2$—CH$_2$—CH$_2$—C(O)—NH—Z, NH$_2$—CH$_2$—CH$_2$—CH$_2$—CH$_2$—C(O)—NH—Z, $^+$NH$_3$—CH$_2$—CH$_2$—CH$_2$—CH$_2$—C(O)—NH—Z, HOOC—CH$_2$—CH$_2$—CH$_2$—CH$_2$—CH$_2$—C(O)—NH—Z, $^-$OOC—CH$_2$—CH$_2$—CH$_2$—CH$_2$—CH$_2$—C(O)—NH—Z, HO—CH$_2$—CH$_2$—CH$_2$—CH$_2$—CH$_2$—C(O)—NH—Z; H—NH—C(O)—Z, NH$_2$—NH—C(O)—Z, $^+$NH$_3$—NH—C(O)—Z, HOOC—NH—C(O)—Z, $^-$OOC—NH—C(O)—Z; H—CH$_2$—NH—C(O)—Z, NH$_2$—CH$_2$—NH—C(O)—Z, $^+$NH$_3$—CH$_2$—NH—C(O)—Z, HOOC—CH$_2$—NH—C(O)—Z, $^-$OOC—CH$_2$—NH—C(O)—Z, HO—CH$_2$—NH—C(O)—Z; H—CH$_2$—CH$_2$—NH—C(O)—Z, NH$_2$—CH$_2$—CH$_2$—NH—C(O)—Z, $^+$NH$_3$—CH$_2$—CH$_2$—NH—C(O)—Z, HOOC—CH$_2$—CH$_2$—NH—C(O)—Z, $^-$OOC—CH$_2$—CH$_2$—NH—C(O)—Z, HO—CH$_2$—CH$_2$—NH—C(O)—Z; H—CH$_2$—CH$_2$—CH$_2$—NH—C(O)—Z, NH$_2$—CH$_2$—CH$_2$—CH$_2$—NH—C(O)—Z, $^+$NH$_3$—CH$_2$—CH$_2$—CH$_2$—NH—C(O)—Z, HOOC—CH$_2$—CH$_2$—CH$_2$—NH—C(O)—Z, $^-$OOC—CH$_2$—CH$_2$—CH$_2$—NH—C(O)—Z, HO—CH$_2$—CH$_2$—CH$_2$—NH—C(O)—Z; H—CH$_2$—CH$_2$—CH$_2$—CH$_2$—NH—C(O)—Z, NH$_2$—CH$_2$—CH$_2$—CH$_2$—CH$_2$—NH—C(O)—Z, $^+$NH$_3$—CH$_2$—CH$_2$—CH$_2$—CH$_2$—NH—C(O)—Z, HOOC—CH$_2$—CH$_2$—CH$_2$—CH$_2$—NH—C(O)—Z, $^-$OOC—CH$_2$—CH$_2$—CH$_2$—CH$_2$—NH—C(O)—Z, HO—CH$_2$—CH$_2$—CH$_2$—CH$_2$—NH—C(O)—Z; H—CH$_2$—CH$_2$—CH$_2$—CH$_2$—CH$_2$—NH—C(O)—Z, NH$_2$—CH$_2$—CH$_2$—CH$_2$—CH$_2$—CH$_2$—NH—C(O)—Z; $^+$NH$_3$—CH$_2$—CH$_2$—CH$_2$—CH$_2$—CH$_2$—NH—C(O)—Z, HOOC—CH$_2$—CH$_2$—CH$_2$—CH$_2$—CH$_2$—NH—C(O)—; and $^-$OOC—CH$_2$—CH$_2$—CH$_2$—CH$_2$—CH$_2$NH—C(O)—Z, and HO—CH$_2$—CH$_2$—CH$_2$—CH$_2$—CH$_2$—NH—C(O)—Z.

In one embodiment of the present invention, the biologically active residue may be selected from the group consisting of —SO$_2$—C$_6$H$_2$(NO$_2$)$_2$(NEt$_2$), —C$_3$N$_3$(NH$_2$)Cl, and —CH$_2$—CH$_2$—O—SO$_2$—OH. These are the residues for oryzalin, CTZDA (6-Chloro-1,3,5-triazine-2,4-diamine), and AEHS (2-aminoethylhydrogen sulfate), respectively.

In order to increase the efficacy of the antifouling property of the polymer coating, greater amount of biologically active residue may be needed per molecule of the polymer. However, the amount of biologically active residue that may be attached onto a polydimethylsiloxane polymer is limited by the number of reactive side chains. One way to increase the number of the amount of biologically active residues on the polymer molecule is to select a polymer molecule that has a greater number of reactive side chains counted with respect to the dimethylsiloxane units. For example, the ratio of the 3-aminopropylmethylsiloxane unit to the dimethylsiloxane unit can be varied from 3% to 97% to 5% to 95%, or 10% to 90%, or 20% to 80% in order to increase the number of active sites for bonding biologically residues.

In the alternative, or in addition, the number of biologically active residues per molecule may be adjusted by varying the ratio of the side chains containing the heteroaryl group Ar to the antifoulant sidechains. The molar ratio of side chains containing the heteroaryl group Ar to the antifoulant sidechains may be about 9:1, 8:2, 7:3, 6:4, 5:5, 6:4, 7:3, 8:2, or 9:1, or any interpolated ratio.

In addition, the biologically active residue may be bonded to a pendant group, which in turn comprises another biologically active residue. The term "pendant group", as used herein, means a functionalized organic or oligomeric group, that is bound via the —R$^3$—Y$^2$—R$^4$—Y$^3$— to the polydimethylsiloxane backbone, and comprises one or more biologically active residues. The pendant group comprises a functionalized core and one or more biologically active residues.

Examples of such a pendant group include polyamino polyamides, polyamino polyesters, polyamino amide esters, polyamino polyamide esters, polyamino amide polyesters and polyamino polyamide polyesters. The functionalized cores of such pendant groups are based on polyamino carboxylic acids. Examples of suitable polyamino carboxylic acids include IDA, iminodiacetic acid, HEIDA, ethanoldiglycine, NTA, nitrilotriacetic acid, EDTA, ethylenediaminetetraacetic acid, DTPA, pentetic acid, diethylenetriamine pentaacetic acid, EGTA, ethylene glycol tetraacetic acid, BAPTA, 1,2-bis(o-aminophenoxy)ethane-N,N,N',N'-tetraacetic acid, NOTA, 2,2',2''-(1,4,7-triazanonane-1,4,7-triyl)triacetic acid, DOTA, 1,4,7,10-tetraazacyclododecane-1,4,7,10-tetraacetic acid, HEDTA, N-(2-hydroxyethyl)ethylenediamine-N,N',N'-triacetic acid, EDDHA, ethylenediamine-N,N'-bis((2-hydroxyphenyl)acetic acid), CDTA, trans-1,2-diaminocyclohexane-N,N,N',N'-tetraacetic acid, DOCTA, dioxaoctamethylene dinitrilo tetraacetic acid, HEDTA, hydroxyethylethylenediamine triacetic acid, TTHA, triethylenetetramine hexaacetic acid, DCTA, and 1,2-diaminocyclohexane tetraacetic acid.

Alternatively, the pendant group may be based on a polyol molecule. Polyols include sugar alcohols. A sugar alcohol is a hydrogenated form of carbohydrate, wherein the carbonyl group has been reduced to a hydroxyl group. Examples of sugar alcohols include glycol, glycerol, erythritol, threitol, arabitol, xylitol, ribitol, mannitol, sorbitol, galactitol, fucitol, iditol, inositol, volemitol, isomalt, maltitol, lactitol, maltotriitol, and maltotetraitol.

The pendant group is bound to the rest of the macromolecule via the bonding group Y$^3$. In case of the pendant group that is based on a polyamino carboxylic acid, the Y$^3$ group is an amido group having the formula —NH—C(O)—, or an ester group having the formula —O—C(O)—. In case of the pendant group that is based on a polyol, the Y$^3$ group is an ester group having the formula —O—C(O)—. Alternatively, the pendant group is bound to the rest of the macromolecule via the bonding group Y$^2$.

The pendant group core is also bound to one or more biologically active residues. The link between the pendant group core and the biologically active residue may be a bond, or an amide group, or an ester group. The use of such pendant groups allows the number of biologically active residues in the polymer to be increased.

The antifouling sidechain comprises biologically active residues and optionally a pendant group, both of which comprise atoms with a lone electron pair. Such atoms with lone electron pairs may also interact with metals.

This invention is further directed to the novel synthetic routes to form the substituted polydimethylsiloxane macromolecules described herein. Such substituted polydimethylsiloxane macromolecules are suitable for the preparation of the polymer coating.

The preparation of the macromolecules comprises a reaction of functionalized dimethylsiloxane with a compound comprising the heteroaryl group Ar which includes at least one atom with the lone electron pair.

The functionalized dimethylsiloxane is a macromolecule which comprises dimethylsiloxane groups and methylsiloxane groups substituted with a hydrocarbylene group R$^1$ terminated with a reactive group. This reactive group reacts under appropriate condition with another reactive group on the compound comprising the heteroaryl group, such that the bonding group $Y^1$ is formed. For example, the functionalized dimethylsiloxane comprising methylsiloxane substituted with a hydrocarbylene group $R^1$ terminated with an amine, such as [—Si(Me)(—$R^1$—$NH_2$)—O—], may react with HOOC—$R^2$—Ar to form a methylsiloxane with a sidechain comprising a group, with the formula [—Si(Me)(—$R^1$—NH—C(O)—$R^2$—Ar)—O—]. In this case, the bonding group $Y^1$ is the amido group —NH—C(O)—.

Similarly, when a functionalized dimethylsiloxane comprising methylsiloxane substituted with a hydrocarbylene group $R^1$ terminated with a hydroxyl group is reacted with HOOC—$R^2$—Ar, then the methylsiloxane with the side chain comprising a group having the formula [—Si(Me)(—$R^1$—O—C(O)—$R^2$—Ar)—O—]. In this case, the bonding group $Y^1$ is the ester group —O—C(O)—.

Further, when a functionalized dimethylsiloxane comprising methylsiloxane substituted with a hydrocarbylene group $R^1$ terminated with a carboxylic acid group is reacted with HO—$R^2$—Ar, then the substituted methylsiloxane has the formula [—Si(Me)(—$R^1$—C(O)—O—$R^2$—Ar)—O—]. In this case, the bonding group $Y^1$ is the ester group —C(O)—O—.

When a functionalized dimethylsiloxane comprising methylsiloxane substituted with a hydrocarbylene group $R^1$ terminated with a carboxylic acid group is reacted with $H_2N$—$R^2$—Ar, then the substituted methylsiloxane has the formula:

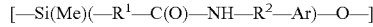

In this case, the bonding group $Y^1$ is the ester group —C(O)—O—.

The functionalized dimethylsiloxane comprising methylsiloxane with a reactive group may be reacted with HOOC—$R^2$—Ar in the presence of a solvent, a coupling reagent, or a catalyst.

Examples of suitable heteroaryl compounds include benzotriazole carboxylic acid, 6-amino-2-mercaptobenzothialoze, 6-aminobenzimidazole, 5-aminobenzimidazole, 5-benzimidazole carboxylic acid, 1H-benzimidazol-6-ol, 1H-benzimidazol-4-ol, 5-amino-2-mercaptobenzimidazole, 2-mercapto-1H-benzimidazole-6-carboxylic acid, 5-Amino-1H-benzotriazole, 1H-1,2,3-benzotriazol-7-ol, 4-Hydroxy-1H-benzotriazole, 1H-imidazole-4-carbothioamide, 4-imidazoleacetic acid, cis-urocanic acid, and 3-(1H-imidazol-4-yl)-benzylamine.

Any solvent, or carrier, that aids in the synthesis of the substituted polydimethylsiloxane macromolecules suitable for the coating composition, may be utilized. Examples of such solvents include dimethylformamide, DMSO, $CH_2Cl_2$, toluene, glycerin, 1-octanol, 1,2-propanediol, 2-ethyl-1-hexanol, water, dipropylene glycol butyl ether, diethylene glycol butyl ether, tripropylene glycol, dipropylene glycol, isopropyl myristate, 3-octanol, silanols, mixtures thereof and the like. In cases where the solvent comprises water, distilled or deionized water is preferred. The solvent used for the synthesis of the substituted polydimethylsiloxane macromolecules suitable for the coating composition, may be a mixture of solvents.

Because the synthesis of the amide bonding group typically does not occur spontaneously at room temperature, the reaction takes place at elevated temperatures. For example, the reaction may take place at reflux conditions for an hour.

In the alternative, the synthesis may be aided by the use of a coupling reagent, wherein the carboxylic acid is activated by converting the OH of the acid into a good leaving group prior to the treatment with the amine. Such coupling agents may be based on dicyclohexylcabodiimide, benzotriazole, halo-phosphonium, halo-sulfonium, halo-dioxolium, halo-dithiolium, halo-thiaziolium, halo-pyridinium, triazine, pentfluorophenol, 3,4-dihydro-3-hydroxy-4-oxo-1,2,3-benzotriazine, 2-hydroxysuccinimide, 2-(5-norborene-2,3-dicarboximide, chloroformate, and like. Additional coupling agents and additives that may be used in the formation of the amide group which may be useful in preparation of the macromolecule of the present invention are listed in E. Valeur, M. Bradley, 38 Chem. Soc. Rev. 606-631 (2009).

The reaction mixture may also comprise a catalyst. The catalyst for amide group formation may be boric acid. In cases of forming of the ester group, the catalyst may be an acid or a base. Further, in cases of forming of the ester group, a dehydrating agent may be used. Examples of dehydrating agents include sulfuric acid, N,N'-dicyclohexylcarbodiimide, trimethylorthoformate, acetic anhydride, trifluoroacetic anhydride, polyphosphoric acid, phosphorus pentaoxide, methanesulfonyl chloride, phosphorus pentachloride, thionyl chloride, and molecular sieves.

It is known in the art, such as for example U.S. Pat. No. 6,384,281 that boric acid is a catalyst for amide reactions with carboxylic acids and aromatic amines. The art however does not teach the amidization using boric acid with non-aromatic amines. In addition the art teaches that reaction water is to be removed during synthesis. Removal of water, indeed absence of water, favors side reactions such as ester reactions rather than more stable amide reactions.

In one embodiment of the present invention, polydimethylsiloxane comprising a side chain that includes amino functional groups is reacted with benzotriazole carboxylic acid to form covalent amide linkages using boric acid as a catalyst in the presence of heat. Such a reaction yields a polymer with a moiety capable of interacting with, for example, copper and/or copper alloy-containing surfaces.

A copolymer containing 3 mol % of aminopropylmethylsiloxane and 97 mol % dimethylsiloxane, may be reacted with 1H-benzotriazolecarboxylic acid in the presence of boric acid, and a solvent mixture of, for example, 1,2-propanediol, 1-octanol, and water. In the reaction, the molar ratio of 1H-benzotriazolecarboxylic acid to the available aminopropyl groups may be 0.5:1. The structure of the product of this reaction ("the first intermediate") is presumed to be:

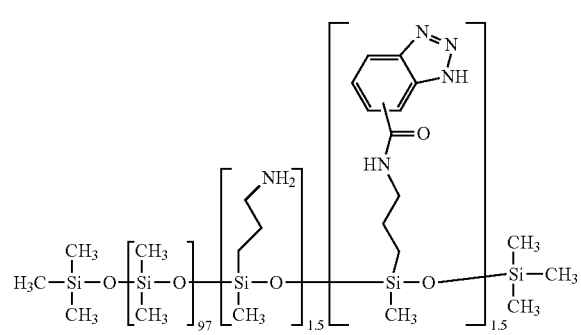

It has been found that the above reaction may be carried out at 110° C. for 1 hour. However, longer or shorter mixing periods can be used and higher or lower temperatures can be used. The presence of water in the synthesis appears to drive the reaction such that amide formation between the carboxylic acid and the amine is favored rather than ester formation with the hydroxyls in the propane diol and octanol solvents.

Such a reaction may be carried out in stoichiometric ratio of 1:1, wherein the number of moles of amino functional groups equals to the number of moles of benzotriazole carboxylic acids. However, if the above reaction is carried out with fewer carboxylic acid groups than the available amino functional groups on an equivalent weight basis, the remaining amino groups may be left unreacted, for a possible reaction with other compounds comprising carboxylic acid groups. The benzotriazole carboxylic acid can be either the 4-isomer or the 5-isomer.

The reaction of a 3 mol % aminopropylmethylsiloxane 97 mol % dimethylsiloxane copolymer may be reacted with 1H-benzotriazolecarboxylic acid, in the presence of the catalyst boric acid, and a solvent mixture of 1,2-propanediol, 1-octanol, and water, wherein the molar ratio of 1H-benzotriazolecarboxylic acid to the available aminopropyl groups is 0.9:1, as illustrated by Example 1. Because unreacted 1H-benzotriazolecarboxylic acid that may be present in the formulation after the completion of the synthesis can lead to corrosion of copper and copper alloys, it is preferred that the molar ratio of 1H-benzotriazolecarboxylic acid to the available aminopropyl groups is <1:1.

The structure of the synthesized product for the above reaction is presumed to be:

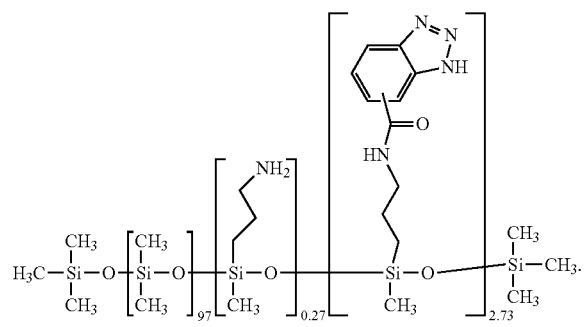

The advantage of preparing a polymer wherein only a fraction of the amines are reacted to form the side chain that interacts with metal atoms, is that this polymer may be further reacted with additional compounds. For example, such polymer may be reacted further to yield a polymer comprising antifouling side chains. Thus, this polymer may be considered the first intermediate.

In addition, or in alternative, to reacting the polymer comprising a sidechain that comprises an amine group with a heteroaryl group, the polymer comprising a sidechain that comprises an amine group may react with a compound that comprises more than one carboxylic acid. In such a case the polymer would comprise sidechains that are terminated by a carboxylic acid group. For example, the reaction of an aminopropylmethylsiloxane unit with an alkyldioic acid results in a carboxyalkylamidopropylmethylsiloxane unit.

The amine groups of this aminopropylmethylsiloxanedimethylsiloxane copolymer first intermediate may also be reacted with a compound comprising two or more carboxylic acids. Such a reaction may also be carried in the presence of one or more of a catalyst, a solvent, and a coupling agent. The above depicted first intermediate may be further reacted with pentanedioic acid (a compound comprising two carboxylic acids) in the presence of a boric acid catalyst and heat. The structure of the product of this reaction ("the second intermediate") is presumed to be:

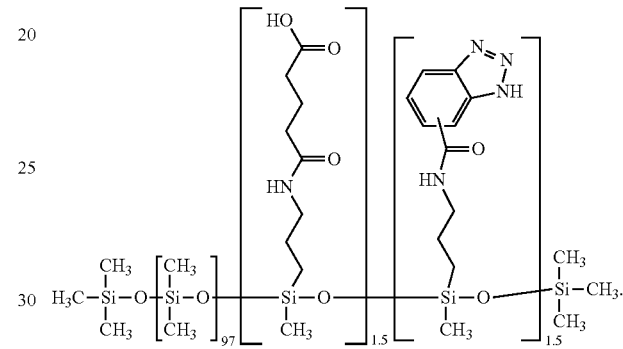

This second intermediate may be further reacted with compounds that react with carboxylic acid groups, such as alcohols or amines. For example, this polymer may be reacted further with 2-aminoethylhydrogen sulfate (also known as ethanolamine-O-sulfate, AEHS) in a 1:1 stoichiometric amount, thereby providing a sulfate group on the polymer. The structure of the product of this reaction is presumed to be:

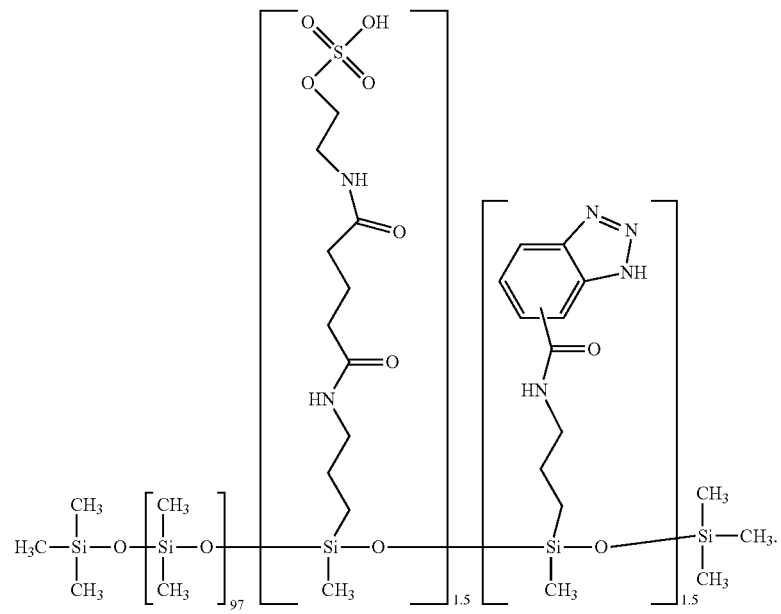

The efficacy of the polymer as an antifoulant composition was tested by formulating the polymer into a coating composition. This coating composition, when applied to propellers, and exposed to conditions under which barnacles typically grow, showed reduced barnacle growth. This data indicates that the polymer of the present invention may provide protection against fouling organisms.

Other biologically active groups may be used to control fouling by reacting biologically active compounds with a reactive side chain of the polymer of the invention. In one embodiment, a pre-emergent herbicide comprising an amine group may be reacted with the second intermediate product described above. For example, oryzalin can be reacted with the carboxylic acid group of the oligomer and/or polymer in the presence of boric acid and heat to produce a polymer adapted to prevent the emergence of certain types of plant growth. The structure of the product of this reaction is presumed to be:

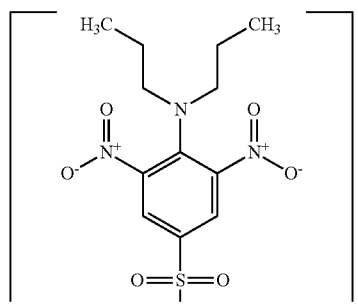

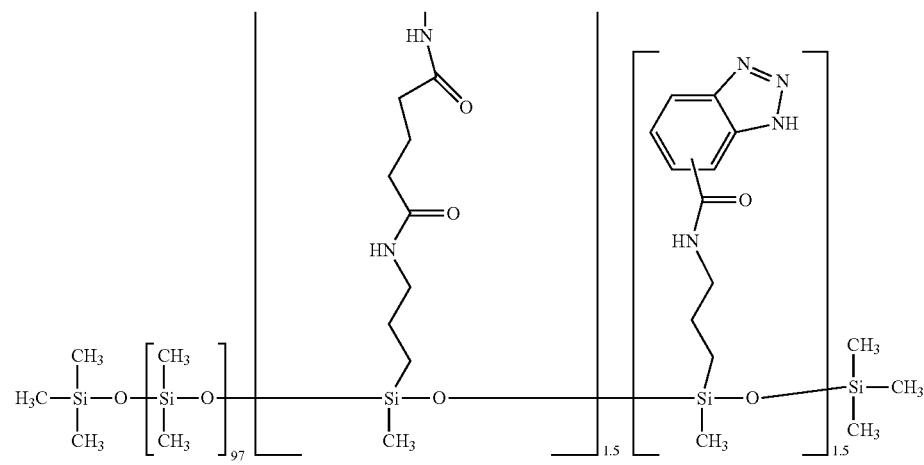

In addition to the use of a pre-emergent herbicide, post-emergent herbicides may also be used in a similar manner. For example, CTZDA (6-Chloro-1,3,5-triazine-2,4-diamine) can be reacted with the polymer of the invention in the presence of boric acid and heat to produce a polymer composition adapted to have activity as a post-emergent herbicide. The structure of the product of this reaction is presumed to be:

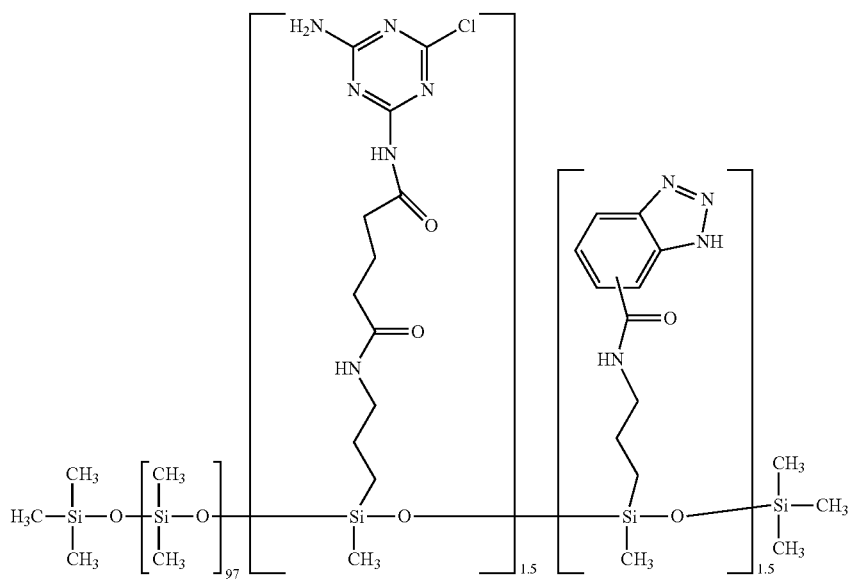

In addition to reacting biologically active compounds comprising carboxylic acids with the amine groups on the substituted polydimethylsiloxane first intermediate, it is also possible to react epoxides with the amine groups in a similar manner. As illustrated by Example 8 below, di-epoxied hydrogenated bisphenol A diglycidyl ether may be reacted with the first intermediate described above. The structure of the product this reaction is presumed to be:

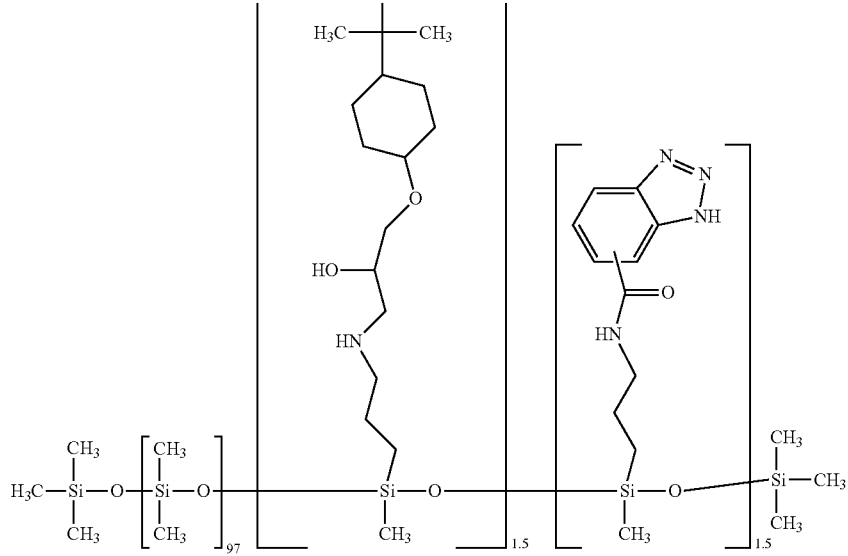

This product may be further reacted with AEHS and water. The structure of the product of this reaction is presumed to be:

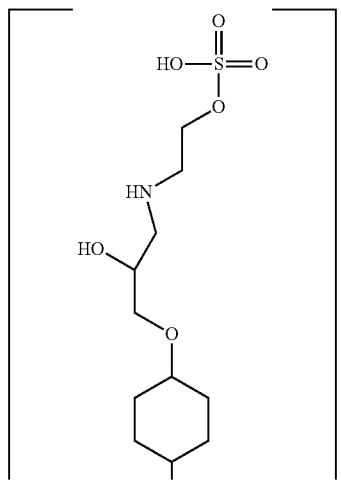

composition comprising CTZDA residue alone (or AEHS residue alone) would be efficacious only against one type of the fouling organism and not as much against the other. But

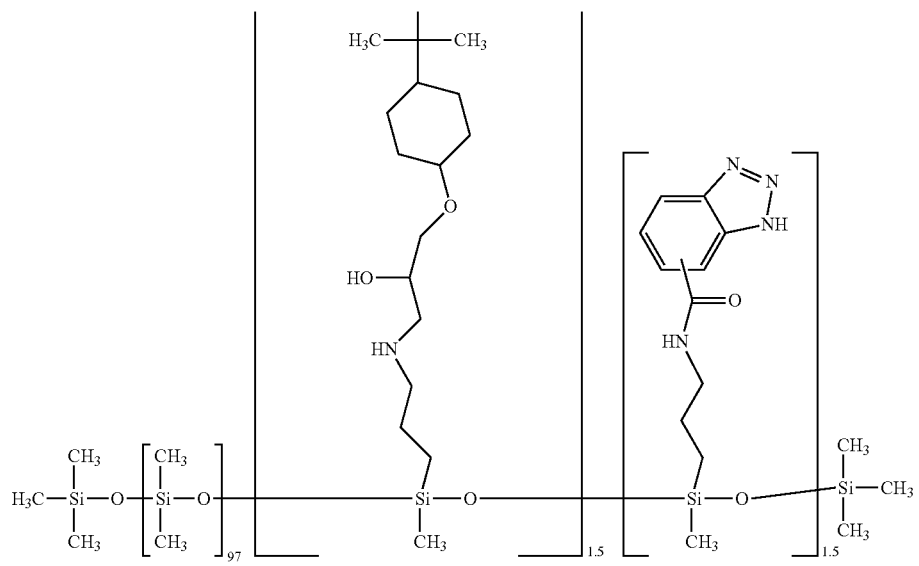

This polymer has a biologically active residue, which would make the polymer useful as a antifouling coating composition.

In addition to using a particular biologically active compound to prepare the antifouling coating composition, several prepared antifoulant polymer compositions may be mixed and optionally reacted further. The advantage of using a mixture of polymers comprising various biologically active residues, over the use of polymers with only one type of a biologically active residue, is that different fouling organisms are affected differently by different residues. By using several biologically active residues, biological activity against a broad spectrum of fouling organisms can be obtained. Thus, for example, if one type of a fouling organism is affected preferentially by CTZDA, and a second type is affected preferentially by AEHS, then the antifouling using several biologically active residues, results in a broader biological activity against a wide spectrum of fouling organisms.

The synthesis of a copolymer comprising siloxane units substituted with a pendant group that comprises biologically active residue may be performed by reacting a polymer comprising a reactive side chain with a polyfunctional compound, and subsequently reacting this intermediate product with one or more biologically active compounds, as exemplified above. The polyfunctional compound forms the core of the pendant group and the biologically active compound forms the biologically active residue.

A one-pot preparation of a copolymer comprising units substituted with a pendant group that comprises a biologically active residue is illustrated by the reaction of pentetic acid with AEHS and oryzalin. The structure of the product of this reaction is presumed to be:

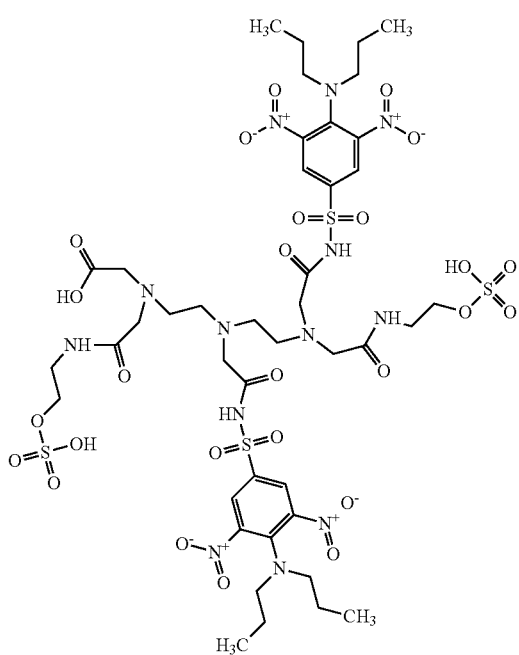

This intermediate may then be further reacted with the copolymer comprising the 3-aminopropyl side chain to yield a product which is presumed to be:

A lubricious coating for a medical device, for example a catheter, can be obtained by reacting poly(ethylene glycol) 2-aminoethyl ether biotin with hydrocarbyl aryl Ar compound, such as 1H-benzotriazolecarboxylic acid, as illustrated in the procedure of Example 12 below. Although in this example the ethylene glycol comprises approximately 110 ethylene groups, in the practice of the invention any number of ethylene groups may be used. The structure of the product of this reaction is presumed to be:

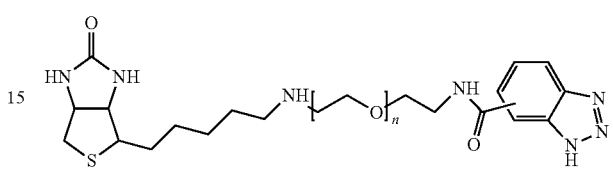

This product may be applied to the surface of, for example, a copper or copper alloy catheter thereby obtaining a catheter with a chemically bound lubricious coating adhered to the catheter surface. Such a chemical binding would be likely more tenacious than mechanically bound lubricious coatings. Other moieties could be bound to the polymer, which moieties, for example, could provide antimicrobial properties.

Any of the previously discussed reactions are conducted in suitable solvents and co-solvents such as for example propylene diol or alcohols that may act as solvents or co-solvents yet are safe for shipping and consumer use. Such

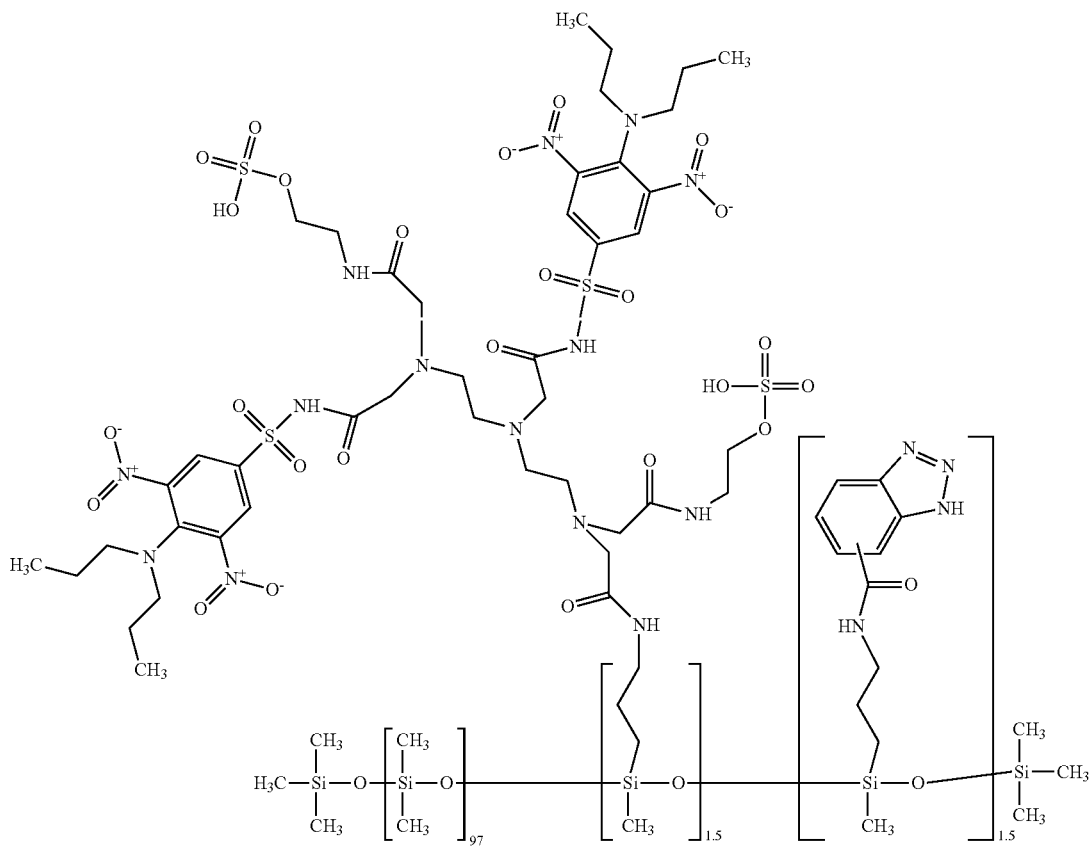

solvents often contain hydroxyl groups that may react with carboxylic acid groups forming esters with the solvent rather than amides with the oligomer and/or polymer. Esther formation may be avoided or replaced in the above reactions by the addition of excess water.

Further, in the above reactions, rather than utilizing a di- or multi-carboxylic acid as a linking group between an amine on the polymer and an amine group on the antifoulant moiety, a di-epoxide or a multi-epoxide might be substituted. Such a reaction would not require the presence of boric acid, excess water, or heat.

It is most preferred to prepare the above reactions in the solvents used in the final product formulations. This entails the use of solvents that are safe for the final consumer and that do not require special precautions while shipping. For example, each of the above carboxylic acid/amine reaction steps can be prepared in solvents such as octanol, water, and propane diol as concentrated solutions and then simply diluted in octanol and propane diol for commercial distribution. There are no known side reactions and hazardous chemicals are not used in the reactions so there is a significant advantage in that clean-up-steps and filtering steps are not required for the synthesis or the formulation steps. After each step in the synthesis, the new modifying synthesis component is simply added to the synthesis pot. The synthetic intermediates may be filtered and separated, but it is has been found that such filtration and separation is not necessary.

EXAMPLES

Example 1

Preparation of dimethylsiloxane, 3-(1H-benzotriazoleamide)propylmethylsiloxane and 3-aminopropylmethylsiloxane terpolymer A terpolymer of dimethylsiloxane, 3-aminopropylmethylsiloxane (189.329 g, mean molecular weight 8000 g/mol, CAS No. 99363-37-8, obtained from Gelest, Inc., Morrisville, Pa., USA as AMS-152), and 1H-benzotriazolecarboxylic acid (10.671 g, available from Sigma-Aldrich, St. Louis, Mo., USA) was made. The three monomers and boric acid (1.011 g, Sigma-Aldrich), 1,2-propanediol (399.494 g, Sigma-Aldrich), 1-octanol (332.91 g, Sigma-Aldrich), and water (66.58 g) are added to a three-neck, 3-liter round bottom flask equipped with a reflux condenser and a magnetic stirring rod. The flask is heated in a 110° C. oil bath while stirring for one hour, after which the mixing is stopped. The reaction mixture is left to cool to room temperature, and the contents are left to settle. The yellowish upper layer comprising mostly 1,2-propanediol and 1-octanol is separated off the more viscous dark brown translucent lower layer. The lower layer is extracted five times with warm 1,2-propanediol to wash away any unreacted 1H-benzotriazolecarboxylic acid. Each terpolymer chain contains an average of about 99.5 units of dimethylsiloxane, an average of about 0.27 units of 3-aminopropylmethylsiloxane and an average of 2.73 units of 3-(1H-benzotriazoleamide) propylmethylsiloxane.

Example 2

Preparation of dimethylsiloxane, 3-(1H-benzotriazoleamide)propylmethylsiloxane and 3-aminopropylmethylsiloxane terpolymer A terpolymer of dimethylsiloxane and 3-aminopropylmethylsiloxane (193.93 g, mean molecular weight 8000 g/mol), and 1H-benzotriazolecarboxylic acid (6.072 g) is made by adding the three monomers, boric acid (0.575 g), 1,2-propanediol (399.71 g), 1-octanol (333.09 g), and water (66.62 g) to a three-neck, 3-liter round bottom flask equipped with a reflux condenser and a magnetic stirring rod. The flask is heated in a 110° C. oil bath while stirring for one hour, after which the mixing is stopped. The reaction mixture is left to cool to room temperature, and the contents are left to settle. The yellowish upper layer comprising mostly 1,2-propanediol and 1-octanol is separated from the more viscous dark brown translucent lower layer. The lower layer comprises a terpolymer wherein each terpolymer chain contains an average of about 99.5 units of dimethylsiloxane, an average of about 1.5 units of 3-aminopropylmethylsiloxane and an average of 1.5 units of 3-(1H-benzotriazoleamide)propylmethylsiloxane.

Example 3

Preparation of dimethylsiloxane, 3-(1H-benzotriazoleamide)propylmethylsiloxane and 3-(3-carboxypropylamine)propylmethylsiloxane terpolymer Pentanedioic acid (4.995 g) is added to the reaction product of Example 2, which contains the synthesized terpolymer, boric acid catalyst, and a mixture of 1,2-propanediol, water and 1-octanol solvents. The flask is heated in a 110° C. oil bath while stirring for one hour, after which the mixing is stopped. The mixture is left to cool to room temperature, and the contents are left to settle. The yellowish upper layer comprising mostly 1,2-propanediol and 1-octanol is separated off the more viscous dark brown translucent lower layer. The lower layer comprises a terpolymer wherein each terpolymer chain contains an average of about 99.5 units of dimethylsiloxane, an average of about 1.5 units of 3-(3-carboxypropylamide)propylmethylsiloxane and an average of 2.73 units of 3-(1H-benzotriazoleamide)propylmethylsiloxane.

Example 4

Preparation of dimethylsiloxane, 3-(1H-benzotriazoleamide)propylmethylsiloxane and 3-(3-(2-hydrogensulfate ethaneamide)propylamide)propylmethylsiloxane terpolymer Ethanolamine-O-sulfate (5.291 g) and 41.143 g of water is added to the reaction product of Example 3, which contains the synthesized dimethylsiloxane, 3-(1H-benzotriazoleamide)propylmethylsiloxane and 3-(3-carboxypropylamide)propylmethylsiloxane terpolymer, boric acid catalyst, and a mixture of 1,2-propanediol, water and 1-octanol solvents. The flask is heated in a 110° C. oil bath while stirring for one hour, after which the mixing is stopped. The mixture is left to cool to room temperature, and the contents are left to settle. The yellowish upper layer comprising mostly 1,2-propanediol and 1-octanol is separated off the more viscous dark brown translucent lower layer. The lower layer is extracted five times with warm 1,2-propanediol to wash away any unreacted 1H-benzotriazolecarboxylic acid. The lower layer comprises a terpolymer wherein each terpolymer chain contains an average of about 99.5 dimethylsiloxane units, about 1.5 3-(1H-benzotriazoleamide)propylmethylsiloxane units and about 1.5 3-(3-(2-hydrogen sulfate ethaneamide)propylamide)propylmethylsiloxane units.

Example 4A

A terpolymer of the type synthesized in Example 4 was formulated into a coating composition, and applied to propellers. Exposure of the coated propellers to sea conditions under which barnacles typically grow, showed reduced barnacle growth on the surface of the coated propellers compared to propellers that were not coated.

Example 5

Preparation of dimethylsiloxane, 3-(1H-benzotriazoleamide)propylmethylsiloxane and 3-{[5-({[4-(dipropylamino)-3,5-dinitro phenyl]sulfonyl}amino)-5-oxopentanoyl]amino}propylmethylsiloxane terpolymer Surflan™ AS (available from Southern Agricultural Insecticides, Inc., Palmetto, Fla., containing 12.983 g of 4-(dipropylamino)-3,5-dinitrobenzenesulfonamide in 9.577 g of 1,2-propanediol and 9.577 g of glycerin) and 52.755 g of 1,2-propanediol is added to the reaction product of Example 3, which contains the synthesized terpolymer, boric acid catalyst, and a mixture of 1,2-propanediol, water and 1-octanol solvents. The flask is heated in a 110° C. oil bath while stirring for one hour, after which the mixing is stopped. The mixture is left to cool to room temperature, and the contents are left to settle. The yellowish upper layer comprising mostly 1,2-propanediol and 1-octanol is separated off the more viscous dark brown translucent lower layer. The lower layer is extracted five times with warm 1,2-propanediol to wash away any unreacted 1H-benzotriazolecarboxylic acid. The lower layer comprises a terpolymer wherein each terpolymer chain contains an average of about 99.5 dimethylsiloxane units, about 1.5 3-(1H-benzotriazoleamide)propylmethylsiloxane units and about 1.5 3-{[5-(N-{[4-(dipropylamino)-3,5-dinitrophenyl]sulfonyl}amido)pentanoyl]amino}propylmethylsiloxane units.

The resulting product of Example 5 is diluted with water to a 2% concentration and then sprayed on moss and several leafy plants. Within 5 days the moss turns brown and the leaves of the other plants begin to brown.

Example 6

Preparation of dimethylsiloxane, 3-(1H-benzotriazoleamide)propylmethylsiloxane and 3-{[5-(N-(4-amino-6-chloro-1,3,5-triazin-2-yl)amido)pentanoyl]amino}propylmethylsiloxane terpolymer 6-Chloro-1,3,5-triazine-2,4-diamine (CTZDA, 5.456 g), and 41.801 g of 1,2-propanediol is added to the reaction product of Example 3, which contains the synthesized terpolymer, boric acid catalyst, and a mixture of 1,2-propanediol, water and 1-octanol solvents. The flask is heated in a 110° C. oil bath while stirring for two hours, to dissolve most of the CTZDA. The mixture is left to cool to room temperature, and the contents are left to settle. The result upon cooling is a clear yellowish low viscosity liquid from the solvents on top and a slightly cloudy brownish higher viscosity liquid on the bottom. The lower layer is separated in a similar manner as in the Example 5 to yield the terpolymer wherein each terpolymer chain contains an average of about 99.5 dimethylsiloxane units, about 1.5 3-(1H-benzotriazoleamide)propylmethylsiloxane units and about 1.5 \3-{[5-(N-(4-amino-6-chloro-1,3,5-triazin-2-yl)amido)pentanoyl]amino}propylmethylsiloxane units.

An application of the resulting product of Example 6 diluted with water to a 2% concentration onto moss turns the moss turns brown within three days. A similar application onto a variety of leafy plants and grasses similarly begin to turn the plants brown.

Example 7

Preparation of a Four-Component Formulation

One gram each of the resulting compositions from formulations made similar to Examples 1, 4, 5, and 6 were added to a scintillation vial. Each of the compositions comprised 0.2 grams of synthesized active ingredient and solvents such as 1,2-propanediol, glycerin, 1-octanol, and water. To the scintillation vial were added 0.6 grams of benzotriazole, 8.353 grams of 1,2-propanediol, and 7.049 grams of 1-octanol to yield a total mixture weight of 20 grams. The mixture was heated in a microwave oven for 15 seconds, then the mixture was homogeneous. The resulting mixture was light brown in color and slightly cloudy. Some settling occurs over time but the formulation is easily re-mixed or re-dispersed by light agitation.

Similar formulations to Example 7 have been tested on marine propellers in the waters of the Caribbean Sea. The propellers were prepared by removing any residual growth. The propellers were then sanded with a fine sandpaper (220 to 320 grit) or cleaned with a non-twisted wire-brush mounted on a right-angle grinder. Next, the resulting grit and oils were removed using alcohol or acetone solvents and clean towels. Following this cleaning the mixture prepared above was applied with a small piece of gauze or cotton ball on the propeller surface. The propeller surface was wiped several times with the mixture without rubbing but enough to rewet the propeller surface and ensure all the surface of the propeller was coated.

Propellers coated with an antifoulant formulation similar to those of Example 7 have remained bright bronze for approximately 3 months of routine use. Propellers which were used less frequently became dulled from settled matter and/or exhibited signs of growth. Such propellers are easily cleaned with a mesh coated sponge. The resulting surface after cleaning is again bright bronze even after an additional two months or 5 months total testing.

Example 8

Preparation of dimethylsiloxane, 3-(1H-benzotriazoleamide)propylmethylsiloxane and 3-{[3-(4-{2-[4-(oxiran-2-ylmethoxy)cyclohexyl]propan-2-yl}cyclohexyloxy)-2-hydroxypropyl]amino}propylmethylsiloxane terpolymer Hydrogenated bisphenol A diglycidyl di-epoxide ether (available from Momentive Specialty Chemicals Inc. as Eponex 1510, 1.626 g, in an epoxy to amine ratio of 2:1) is added to a 10% portion of the reaction product of Example 2, which contains 20.0 g of the synthesized terpolymer, 0.058 g of boric acid catalyst, 39.97 g of 1,2-propanediol, 6.66 g of water and 33.31 g of 1-octanol. The use of an ultrasound apparatus for an hour aided in achieving homogeneity and aided the epoxy-amine reaction.

The resulting mixture comprises about 21.626 g of synthesized terpolymer wherein each terpolymer chain contains an average of about 99.5 dimethylsiloxane units, about 1.5

3-(1H-benzotriazoleamide)propylmethylsiloxane units and about 1.5 3-{[3-(4-{2-[4-(oxiran-2-ylmethoxy)cyclohexyl] propan-2-yl}cyclohexyloxy)-2-hydroxypropyl] amino}propylmethylsiloxane units.

Example 9

Preparation of dimethylsiloxane, 3-(1H-benzotriazoleamide)propylmethylsiloxane and 3-{[3-(4-{2-[4-(2-methyl-3-{[2-(hydrogensulfide)ethyl] amino}propoxy)cyclohexyl]propan-2-yl}cyclohexyloxy)-2-hydroxypropyl] amino}propylmethylsiloxane terpolymer To the reaction product of Example 8, comprising about 21.626 g of synthesized terpolymer, 0.058 g of boric acid, 39.97 g of 1,2-propanediol, 6.66 g of water and 33.31 g of 1-octanol, is added 0.536 g of 2-aminoethylhydrogen sulfate and 8.65 g of water. The ratio of the reactive epoxy sites to 2-aminoethylhydrogen sulfate is 1:1. The mixture is placed in an ultrasonic bath for 1 hour, during which time the mixture warms up, allowing the 2-aminoethylhydrogen sulfate to dissolve in the warmer mixture and react with the epoxy groups to be tethered to the copolymer.

The resulting mixture comprises about 21.626 g of synthesized terpolymer wherein each terpolymer chain contains an average of about 99.5 dimethylsiloxane units, about 1.5 3-(1H-benzotriazoleamide)propylmethylsiloxane units and about 1.5 3-({3-[4-(2-{4-[(2-methyl-3-{[2-(sulfooxy)ethyl] amino}propoxy)methyl]cyclohexyl}propan-2-yl)cyclohexyloxy]-2-hydroxypropyl}amino)propylmethylsiloxane units.

Example 10

Preparation of dimethylsiloxane,3-(1H-benzotriazoleamide)propylmethylsiloxane and 3-({3-[4-(2-{4-[3-({[4-(dipropylamino)-3,5-dinitrophenyl] sulfonyl}amino)-2-hydroxypropoxyl] cyclohexyl}propan-2-yl)cyclohexyloxy]-2-hydroxypropyl}amino)propylmethylsiloxane terpolymer To the reaction product of Example 8, comprising about 21.626 g of synthesized terpolymer, 0.058 g of boric acid, 39.97 g of 1,2-propanediol, 6.66 g of water and 33.31 g of 1-octanol, is added Surflan AS (consisting of 1.316 g of 4-(dipropylamino)-3,5-dinitrobenzenesulfonamide and 1.941 g of 1,2-propanediol and glycerin mixture) and additional 9.824 g of 1,2-propanediol. The last 1,2-propanediol is added to dilute the concentration of the synthesis product to 20% to simplify preparation of further formulations. The reactant ratio of the reactive epoxy sites on the copolymer to 4-(dipropylamino)-3,5-dinitrobenzenesulfonamide is about 1:1.

The mixture is placed in an ultrasonic bath for 1 hour, during which time the mixture warms up, resulting in aiding the reaction of the sulfonamide with an epoxy group on the copolymer.

The resulting mixture comprises a terpolymer wherein each terpolymer chain contains an average of about 99.5 dimethylsiloxane units, about 1.5 3-(1H-benzotriazoleamide)propylmethylsiloxane units and about 1.5 3-({3-[4-(2-{4-[3-({[4-(dipropylamino)-3,5-dinitrophenyl]sulfonyl} amino)-2-hydroxypropoxyl]cyclohexyl}propan-2-yl)cyclohexyloxy]-2-hydroxypropyl}amino)propylmethylsiloxane units.

Example 11

Preparation of a Four-Component Formulation

One gram each of the resulting compositions from Examples 1, 6, 9, and 10, are added to a scintillation vial. Each of the compositions comprises 0.2 grams of synthesized active ingredient and solvents such as 1,2-propanediol, glycerin, 1-octanol, and water. To the scintillation vial are added 0.6 grams of benzotriazole, 9.790 g of additional 1,2-propanediol, and 5.612 g of additional 1-octanol to yield a total mixture weight of 20 grams.

Example 12

Preparation of a Lubricious Coating for a Medical Device 0.105 g of 1H-benzotriazolecarboxylic acid, 0.020 g of boric acid, 3.787 g of poly(ethylene glycol) 2-aminoethyl ether biotin (available from Sigma-Aldrich), 12.546 g of 1,2-propanediol, 3.00 g of water are placed in a scintillation vial with a magnetic stirring bead and placed in a hot oil bath at approximately 110° C. for about an hour. The ratio of carboxylic acid to amine is 0.9.

A solution of the reaction product when applied to the surface of metal surface is expected to provide a lubricious coating that adheres to the surface.

Example 13

A Method of Protecting a Metal Surface by an Application of a Copolymer

A bronze port in a boat was sanded with a fine grit sandpaper, and was then cleaned with denatured alcohol. An antifoulant coating prepared by a method of Example 1 was applied on the non-caulked surfaces of the port. The port had significantly reduced corrosion on exterior surfaces that were exposed to sun and seawater for two years, compared to similar ports that were not coated with the antifouling coating.

Example 14

Synthesis of diethylenetriaminepentaacetic acid polysubstituted with 2-oxo-2-({[4-(dipropylamino)-3,5-dinitrophenyl]sulfonyl}amino)ethyl and/or 2-oxo-2-{[2-(hydrogensulfide)ethyl]amino}ethyl Diethylenetriaminepentaacetic acid (3.077 g, 7.83 mmol available from Sigma Aldrich), 0.020 g of boric acid, 1.231 g (8.7 mmol) of 2-aminoethyl hydrogen sulfate, 1.469 g of Surflan™ AS (consisting of 0.594 g (1.7 mmol) of oryzalin and 0.876 g of 1,2-propanediol and glycerin mixture), 11.585 g of 1,2-propanediol, 4.123 octanol, and 3.00 g of water are added to a scintillation vial and then heated to approximately 110° C. in an oil bath while stirring with a magnetic bead for approximately 1 hour.

The resulting mixture comprises a mixture of diethylenetriaminepentaacetic acid that is substituted at some of the 5 carboxylic sites by an amide bonded to oryzalin or ethyl hydrogen sulfate.

Example 15

Preparation of dimethylsiloxane, 3-(1H-benzotriazoleamide)propylmethylsiloxane and (polysubstituted diethylenetriaminepentaacetic acid)-amidoethyl terpolymer The reaction product obtained by the procedure described in Example 14 comprising 4.90 g of diethylenetriaminepentaacetic acid substituted at some of the 5 carboxylic sites by amide bond to oryzalin or ethyl hydrogen sulfate, 20 mg of boric acid, 12.45 g of a mixture of 1,2-propanediol and glycerin, 4.12 g of 1-octanol, and 3.00 g of water) are combined with the reaction product obtained by the procedure described in Example 2 including the terpolymer, 57 mg of boric acid, 39.97 g of a mixture of 1,2-propanediol and glycerin, 33.31 g of 1-octanol, and 6.66 g of water. This mixture is heated and stirred at approximately 110° C. in an oil bath for approximately 4 hours.

The resulting mixture comprises a terpolymer wherein each terpolymer chain contains an average of about 99.5 dimethylsiloxane units, about 1.5 3-(1H-benzotriazoleamide)propylmethylsiloxane units and about 1.5 (polysubstituted diethylenetriaminepentaacetic acid)-amidoethyl units. The terpolymer has a dimethylsiloxane backbone, (1H-benzotriazoleamide)propyl side chains, and amidoethyl side chains that are bound to diethylenetriaminepentaacetic acid and are substituted with oryzalin or ethyl hydrogen sulfate.

Example 16

Preparation of dimethylsiloxane, 3-(1H-benzotriazoleamide)propylmethylsiloxane and 3-aminopropylmethylsiloxane terpolymer 3.79 g of a combination of dimethylsiloxane and 3-aminopropylmethylsiloxane (mean molecular weight 8000 g/mol, CAS No. 99363-37-8, obtained from Gelest, Inc., Morrisville, Pa., USA as AMS-152), was combined with 1H-benzotriazolecarboxylic acid (0.21 g, available from Sigma-Aldrich, St. Louis, Mo., USA), boric acid catalyst (0.02 g, Sigma-Aldrich), 1,2-propanediol (7.99 g, Sigma-Aldrich), 2-ethyl hexanol (6.66 g, Sigma-Aldrich), and water (1.33 g) in a borosilicate glass scintillation vial. A magnetic stirring bead was added, the vial was capped and placed in a 110° C. silicon oil bath and stirred for one hour, after which the mixing is stopped. The reaction mixture is left to cool to room temperature, and the contents are left to settle. A clear brown colored solution with no residual particles was obtained.

The foregoing examples were presented for the purpose of illustration and description only. The scope of the invention is to be determined from the claims appended hereto.

The invention claimed is:

1. A coating composition comprising a component selected from the group consisting of:

(A) a macromolecule comprising:
   (a) a dimethylsiloxane unit; and
   (b) a substituted methylsiloxane unit of formula:

$$[-Si(Me)(-R^1-Y^1-R^2-Ar)-O-]$$

wherein $R^1$ is a $C_1$ to $C_5$ hydrocarbylene group;
   $Y^1$ is $-NH-C(O)-$, $-C(O)-NH-$, $-C(O)-O-$, or $-O-C(O)-$;
   $R^2$ is a nothing or a $C_1$ to $C_5$ hydrocarbylene group; and
   Ar is a heteroaryl group comprising at least one atom that comprises a lone electron pair, and
   (B) a poly(ethylene glycol) 2-aminoethyl ether biotin containing a heteroaryl group comprising at least one atom that comprises a lone electron pair.

2. The composition of claim 1, wherein the component is the macromolecule (A) and the $Y^1$ group is $-NH-C(O)-$.

3. The composition of claim 1, wherein the atom that comprises a lone electron pair is a nitrogen atom.

4. The composition of claim 1, wherein the heteroaryl group comprises a benzotriazole group.

5. The composition of claim 1, wherein the component is the macromolecule and the macromolecule further comprises;
   (c) a substituted siloxane unit of formula:

$$[-Si(Me)(-R^3-Y^2-R^4-Y^3-Z)-O-]$$

wherein $R^3$ is a $C_1$ to $C_5$ hydrocarbylene group;
   $Y^2$ is $-NH-C(O)-$, $-C(O)-NH-$, $-NH-CH_2-C(OH)-$, $-C(O)-O-$, or $-O-C(O)-$;
   $R^4$ is a nothing or a $C_1$ to $C_5$ hydrocarbylene group;
   $Y^3$ is nothing, $-C(O)-NH-$, $-NH-C(O)-$, $-C(OH)-CH_2-NH-$, $-C(O)-O-$, or $-O-C(O)-$;
   Z is a biologically active residue, or a pendant group comprising the biologically active residue.

6. The composition of claim 5, wherein $-Y^3-Z$ is $-C(O)-NH-Z$, wherein $-NH-Z$ is a group derived from a biologically active compound by removal of a hydrogen atom from an amine group in the biologically active compound.

7. The composition of claim 6, wherein the biologically active compound is selected from the group consisting of oryzalin, 4-(dipropylamino)-3,5-dinitrobenzenesulfonamide, 6-chloro-1,3,5-triazine-2,4-diamine, 2-aminoethylhydrogen sulfate, and ethanolamine-O-sulfate.

8. The composition of claim 5, wherein the biologically active residue is selected from the group consisting of $-SO_2-C_6H_2(NO_2)_2(NEt_2)$, $-C_3N_3(NH_2)Cl$, and $-CH_2-CH_2-O-SO_2-OH$.

9. The composition of claim 5, wherein the pendant group comprises a polyamino polyamide, a polyamino polyester, a polyamino amide ester, a polyamino polyamide ester, a polyamino amide polyester, or a polyamino polyamide polyester.

10. The composition of claim 1, further comprising an anticorrosion additive.

11. A lubricating coating comprising the composition of claim 1.

12. The composition of claim 5, wherein Z is an antimicrobial moiety.

13. A method of mitigating organism growth on a metal surface by applying the coating composition of claim 1.

14. The method of claim 13, wherein the metal surface is a copper or copper alloy surface.

* * * * *

UNITED STATES PATENT AND TRADEMARK OFFICE
CERTIFICATE OF CORRECTION

| | | |
|---|---|---|
| PATENT NO. | : 11,124,609 B2 | Page 1 of 1 |
| APPLICATION NO. | : 16/315385 | |
| DATED | : September 21, 2021 | |
| INVENTOR(S) | : Lawton | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 194 days.

Signed and Sealed this
Sixth Day of May, 2025

Coke Morgan Stewart
*Acting Director of the United States Patent and Trademark Office*